Patented Apr. 1, 1924.

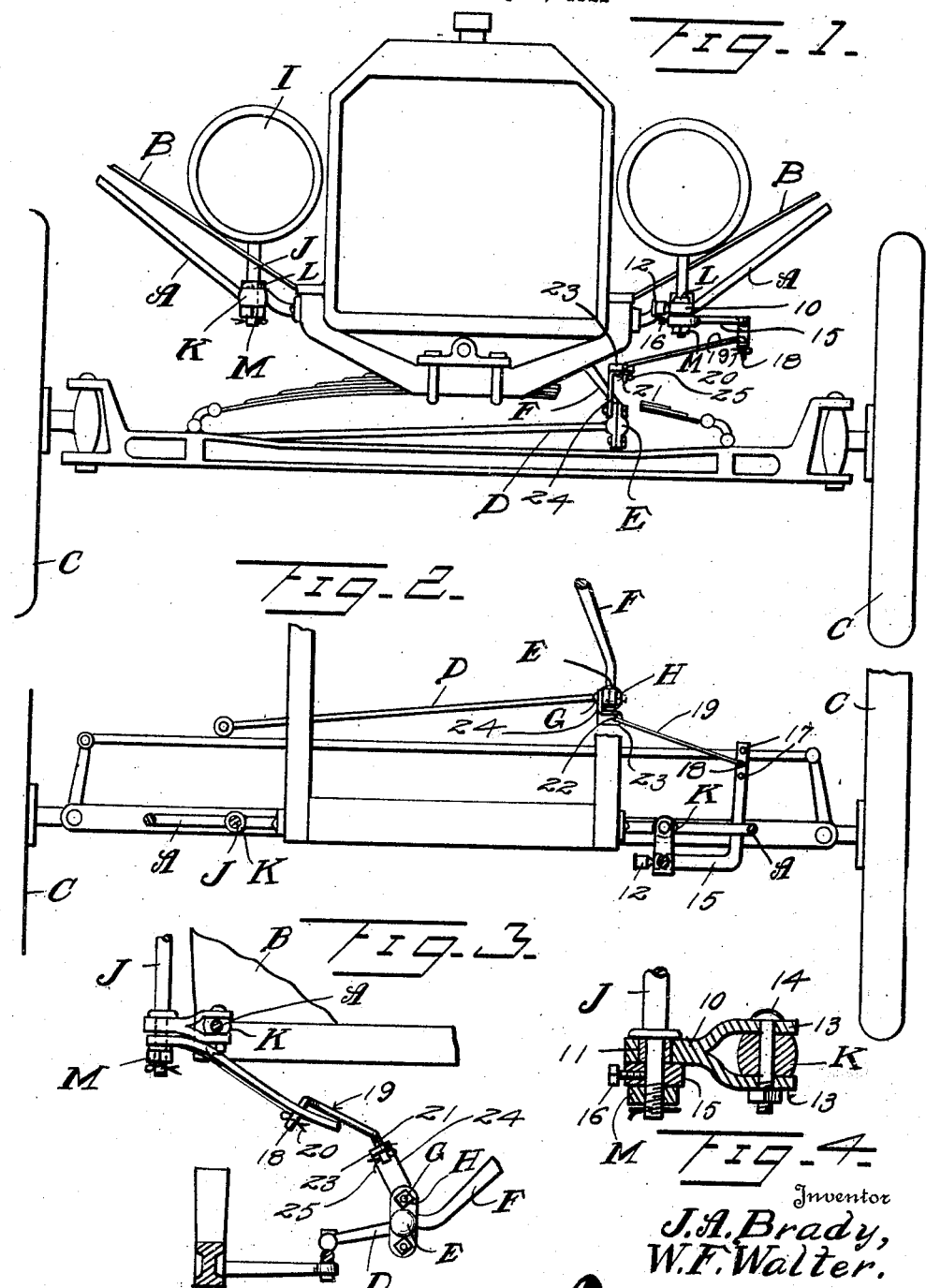

1,488,860

UNITED STATES PATENT OFFICE.

JAMES A. BRADY AND WILLIAM F. WALTER, OF McGIRK, MISSOURI.

AUTOMATICALLY-TURNABLE HEADLIGHT.

Application filed July 5, 1922. Serial No. 572,835.

*To all whom it may concern:*

Be it known that we, JAMES A. BRADY and WILLIAM F. WALTER, citizens of the United States, residing at McGirk, in the county of Moniteau and State of Missouri, have invented certain new and useful Improvements in Automatically-Turnable Headlights; and we do hereby declare the following to be a full, clear, and exact description of the invention, such as will enable others skilled in the art to which it appertains to make and use the same.

This invention relates to a vehicle headlight mechanism.

It is particularly aimed to provide a construction whereby one or more of the headlights of an automobile may be mounted to swing or turn automatically with the wheels thereof and which construction is in the nature of an attachment to be applied to existing automobiles without requiring any alteration in their construction and which attachment particularly cooperates with specific parts of the automobile as will be hereinafter claimed in connection with one embodiment as illustrated in accompanying drawings.

In said drawings:—

Figure 1 is a front elevation illustrating the invention as applied to an automobile;

Figure 2 is a plan view of the parts of Figure 1;

Figure 3 is a view showing the attachment in side elevation and with part of the automobile broken away and in section; and Figure 4 is a perspective view of the parts constituting the invention and as applied to the steering rod and a fender support of the vehicle, the latter being shown fragmentarily.

Like reference characters designate like or similar parts in the different views.

To facilitate an understanding of the invention, automobile parts have been fragmentarily and conventionally shown. Specifically, A indicates a supporting rod or bracket for a front mud guard or fender B over one of the front or steering wheels C. The steering rod is shown at D universally connected at E to a crank F extending from the steering post or equivalent for the vehicle. The universal connection at E includes a bolt G having a fastening nut H thereon. One of the headlights is designated I and has a depending supporting arm J which normally extends through the opening of a sleeve K forming part of the rod A and which is rigidly secured in said opening by means of an abutment or flange L on the arm J and adapted to rest on the sleeve K and by means of a nut M screwed on the arm J and adapted to be screwed down against the lower ends of the sleeve K.

In carrying out our invention, a bearing is provided as at 10 having a bushing 11 disposed in the bearing opening thereof and to which bushing the arm J is transferred from the sleeve K, being journaled in the bushing, having its abutment L resting on the upper surface of the bushing and bearing and the nut M applied thereto and bearing against the under surface of the bearing. An oil cup or other means to lubricate the bearing surface of the arm J is provided at 12, being secured to the bearing 10 and in communication with the bore of the bushing. The inner end of the bearing 10 is bifurcated to provide attaching arms 13 which are adapted to be disposed one above and one below the sleeve K and have a bolt or other securing means as at 14 pass through the arms 13 and the sleeve K in lieu of the arm J. Through tightening of the nut of the bolt 14, said bearing 10 may be rigidly secured in place.

A crank arm is provided as at 15, which may be of L-shape as shown and have an opening adjacent one end thereof whereby the arm may be applied to the arm J intermediate the said nut M and bearing 10. It will be noted that the bearing 10, at the portion where the arm J extends therethrough is of considerably less thickness than the height of the sleeve K, so that the portion of the arm normally disposed in sleeve K may accommodate both the bearing and the crank arm 15 thereon. Said crank arm 15 is rigidly secured to the arm J as by means of a binding screw 16 threaded to the crank arm 15.

The other arm or branch of the crank arm 15 is preferably provided with a plurality of openings therethrough as at 17. One end 18 of a connecting rod 19 is adapted to be selectively passed through the openings 17 and below the same having a cotter key or other fastening 20 pass therethrough to prevent displacement. The other end of connecting rod 19 is angularly disposed, similar to end 18 as at 21 and the same is adapted to be loosely passed through an opening 22 in a lateral offset 23 on an attaching lug 24. End 21 may be secured against displacement from the offset 23 as through the medium of a cotter key or other fastening 25 passed through said end. The lug 24 has an opening therethrough by means of which bolt G may be passed therethrough and the nut H afterwards applied to the bolt so as to rigidly secure the lug to the connecting rod. It will be realized that the structure described forms an attachment for the automobile and does not require any change whatever in the construction of the automobile and furthermore may be readily applied thereto by the novice as well as the skilled mechanic.

It further is to be borne in mind that connection may be made if desired whereby the companion headlight to that shown may be operated automatically.

In use, as the steering post is turned, the crank F is operated which through its connection with the steering rod D moves the latter and steers the wheels as usual. Movable with the steering rod D is the lug H which through the medium of the connecting rod 19 shifts the crank arm 15 and accordingly turns the arm J and the headlight. As a result, the rays of light from the lamp I are projected into the path to be traversed.

As merely one practical embodiment has been illustrated and described, it is to be understood that changes in the details may be resorted to provided they fall within the spirit and scope of the invention.

What is claimed is:—

1. A headlight mechanism including a lamp turning rod, in combination with a fender-supporting member having an opening in which a portion of said rod is normally secured and a fastening on the steering rod of an automobile, said rod having an abutment and a nut thereon, a bearing to which said rod is transferred and in which it is journaled with said abutment resting on the top thereof, said bearing being bifurcated, a bolt passing through the bifurcation of the bearing and through said opening, a crank having a lateral arm secured to said rod between said bearing and said nut, said crank having a rearwardly extending arm, said arm having a plurality of openings therethrough, the said portion of the rod thereby accommodating both of said bearings and said crank arm thereon, a connecting rod for selective attachment in said openings, a lug to be secured in place by said fastening, and said connecting rod being pivotally connected to said lug.

In testimony whereof we affix our signatures in presence of two witnesses.

JAMES A. BRADY.
WILLIAM F. WALTER.

Witnesses:
L. A. BARTLETT,
RAY L. KAY.